July 19, 1927.
D. H. LUDLOW
1,636,310
WHEEL
Filed Aug. 30, 1921
Fig.1.
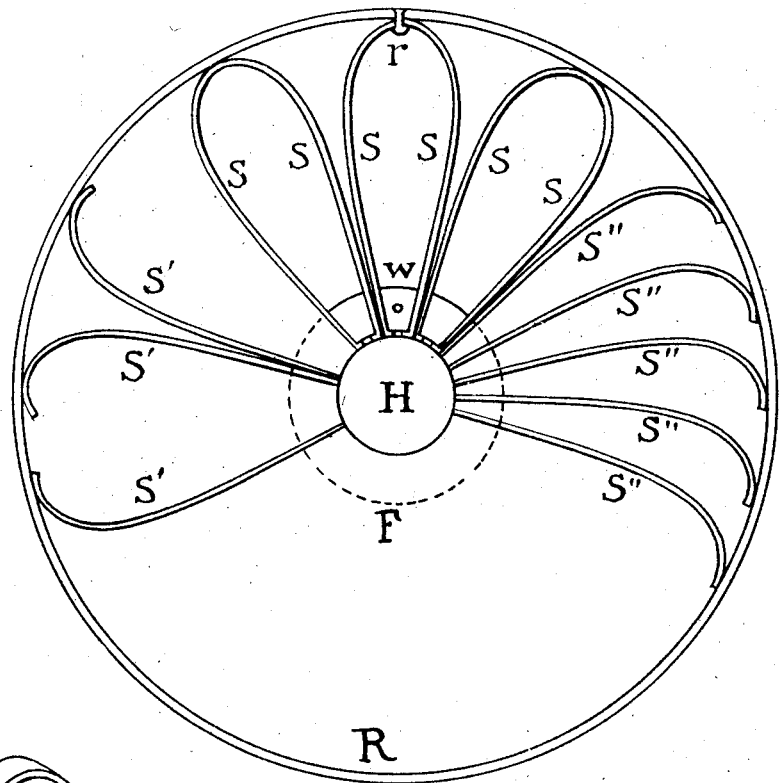
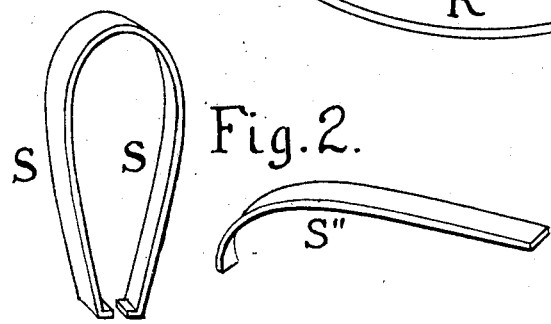
Fig.2.
David H Ludlow,
Inventor.

Patented July 19, 1927.

1,636,310

UNITED STATES PATENT OFFICE.

DAVID H. LUDLOW, OF EASTON, PENNSYLVANIA.

WHEEL.

Application filed August 30, 1921. Serial No. 496,989.

My invention relates to resilient wheels for vehicular and other purposes; and the objects of my improvement are to absorb or distribute vibration, shock and sudden stresses, particularly radial and torque, and to secure better application of force and greater safety, together with simplicity and economy of construction and maintenance, good appearance and quiet operation.

I attain these objects by the mechanism illustrated in the accompanying drawing, in which—

Figure 1 shows in section rim R, hub H, and spokes S S' S" of a wheel embodying my improvement; and Figure 2 shows in perspective typical spokes unconnected with other parts.

Similar letters refer to similar parts.

R is typical of any suitable rim, which may be rigid or not as required, and H of any suitable hub, concentric or excentric.

S S' S" are typical of any resilient spoke radial to hub and tangent to rim, with the intervening portion so curved in plane of wheel-rotation as not to be cut by any straight line tangent to said portion. With this construction, it will be noted, the points of rim and hub attachment of the spoke are necessarily in different wheel-radii and the line of resistance between said points is oblique to said radii, increasing torque resistance. Normal stresses at the rim are resolved into components acting at right-angles to the respective ends of the spoke, assuring distribution of sheer resilience thruout and avoiding undue flexion at any one point. In general the convexity of each spoke is preferably opposed to that of the adjacent spoke on that aspect. Preferably the radius of curvature near the hub is large and the opposed convexities substantially in contact (mediate or immediate) at that point, affording graduated support under compression. Similar supporting action is available at the other end between spoke and rim. Any spoke may be discrete from its fellows or may be integral with either or both of them, and adjacent spokes with facing concavities may have either separate or common rim-attachment. Such differences may well occur in the same wheel, as, for instance, to accommodate valve stems or other tire or rim equipment. The number, size, arrangement, and details of construction and attachment should be suited to the conditions to be met and need not be uniform nor symmetrical thruout the same wheel, particularly in cases of special machinery where different parts may be regularly subject to different stresses or other conditions, requiring local differences in resistance, resilience or arrangement.

Supporting leaves or saddles or both may be used as desired without departing from the spirit of the invention, as may also spokes of more than one ply, whether in contact or not, and radial lugs at the hub may be used to secure the spokes and by extending between opposed convexities give graduated support substantially as above mentioned, but such leaves, saddles, plies and lugs are not here claimed as novel.

F shows position of inner and outer hub-flanges giving direct lateral support to the spokes.

Secured between these flanges by a bolt thru the opening shown, the wedge w, with the aid of a foot or other suitable means of engagement, completes attachment to hub, which method of attachment, however, is merely typical of any means suited to the purpose, whether rigid or jointed, and is not here claimed as novel. If, on a discrete spoke, a foot is used for engagement, one corner may well be rounded to facilitate spoke-replacement. The rivet r is, in like manner, merely typical of any suitable means of rim-attachment, rigid or jointed, and is not here claimed. In both cases rigid attachment is preferred.

I am aware that prior to my invention wheels with some resilience have been made and spokes curved in plane of wheel-rotation have been described, and I do not broadly claim such wheels nor such spokes, but I claim:

1. A wheel having resilient spokes each leaving rim with a gradual curvature tangent thereto and approaching the hub substantially radially, with the entire intervening portion between rim- and hub-attachments so curved in plane of wheel-rotation that the deviation from tangent at successive points shall be always on same side and free from sudden variation, adjacent convexities being mutually apposed and tangent to each other at point of emergence from hub-attachment with resulting slight divergence to permit maximum initial flexing attended by immediate progressive mutual-contact-support opposing further flexure and simultaneously increasing the mechanical efficiency of the resilience, substantially as set forth.

2. A wheel having resilient spokes each leaving rim, with a gradual curvature tangent thereto and approaching the hub substantially radially, with the entire intervening portion between rim- and hub-attachments so curved in plane of wheel-rotation that the deviation from tangent at successive points shall be always on same side and free from sudden variation, adjacent convexities being mutually apposed and tangent to each other at point of emergence from hub-attachment with resulting slight divergence to permit maximum initial flexing attended by immediate progressive mutual-contact-support opposing further flexure and simultaneously increasing the mechanical efficiency of the resilience, substantially as set forth, each spoke being at the rim separate and apart from its neighbor on the concave aspect.

DAVID H. LUDLOW.